US012706360B2

(12) United States Patent
Wang et al.

(10) Patent No.: US 12,706,360 B2
(45) Date of Patent: Aug. 11, 2026

(54) DUAL-MODE DIELECTRIC WAVEGUIDE FILTER AND DIELECTRIC WAVEGUIDE FILTERING APPARATUS

(71) Applicant: Samsung Electronics Co., Ltd., Suwon-si (KR)

(72) Inventors: Ruoming Wang, Shenzhen (CN); Jindong Guo, Shenzhen (CN)

(73) Assignee: Samsung Electronics Co., Ltd., Suwon-si (KR)

(*) Notice: Subject to any disclaimer, the term of this patent is extended or adjusted under 35 U.S.C. 154(b) by 350 days.

(21) Appl. No.: 18/365,685

(22) Filed: Aug. 4, 2023

(65) Prior Publication Data

US 2024/0258671 A1 Aug. 1, 2024

(30) Foreign Application Priority Data

Feb. 1, 2023 (CN) ......................... 202310122284.0

(51) Int. Cl.
*H01P 1/20* (2006.01)
*H01P 1/208* (2006.01)

(52) U.S. Cl.
CPC .......... *H01P 1/2002* (2013.01); *H01P 1/2088* (2013.01)

(58) Field of Classification Search
CPC ................................ H01P 1/2002; H01P 3/16
USPC ........................................................ 333/208
See application file for complete search history.

(56) References Cited

U.S. PATENT DOCUMENTS 6,052,041 A * 4/2000 Ishikawa ............... H01P 1/2084 333/219.1

* cited by examiner

*Primary Examiner* — Andrea Lindgren Baltzell
*Assistant Examiner* — Abigail Amir Yaldo
(74) *Attorney, Agent, or Firm* — Jefferson IP Law, LLP

(57) ABSTRACT

A dual-mode dielectric waveguide filter and a filtering apparatus are provided. The dual-mode dielectric waveguide filter includes a first dielectric cavity including a first dielectric body, a second dielectric cavity including a second dielectric body, electric field directions of the first dielectric cavity and the second dielectric cavity being perpendicular to each other, and a coupling portion connected with the first dielectric body and the second dielectric body to provide a coupling of the first dielectric cavity and the second dielectric cavity, where the first dielectric body and the second dielectric body are both formed in a rectangular parallelepiped shape, the first dielectric body and the second dielectric body are arranged in a stacked manner in a first direction, and two end faces of the first dielectric cavity and the second dielectric cavity in the third direction are formed as a coupling end face.

20 Claims, 6 Drawing Sheets

DUAL-MODE DIELECTRIC WAVEGUIDE FILTER AND DIELECTRIC WAVEGUIDE FILTERING APPARATUS

CROSS-REFERENCE TO RELATED APPLICATION(S)

This application is based on and claims priority under 35 U.S.C. § 119(a) of a Chinese patent application number 202310122284.0, filed on Feb. 1, 2023, in the Chinese Intellectual Property Office, the disclosure of which is incorporated by reference herein in its entirety.

BACKGROUND

1. Field

The disclosure relates to the technical field of communication. More particularly, the disclosure relates to a dual-mode dielectric waveguide filter and a dielectric waveguide filtering apparatus.

2. Description of Related Art

A dielectric waveguide filter has long been the first choice for mobile communication base station filters because of its good electromagnetic shielding, compact structure, low passband insertion loss, small size, and high power capacity.

A single-layer dielectric filter is limited because of its low quality (Q) value and large insertion loss. However, a conventional dual-layer structure needs to weld the two layers, and because the structure is fixed, a coupling structure located in the middle is not adjustable, resulting in poor productivity. Although a dual-mode dielectric filter improves a Q value, adjacent dual-mode dielectric cavities need to be welded by a coupling plate or other structures, resulting in a non-adjustable coupling structure, a large parameter correlation, and a debugging difficulty.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a dual-mode dielectric waveguide filter and a dielectric waveguide filtering apparatus including the dual-mode dielectric waveguide filter, which provides dual-mode filtering by two integrally formed dielectric single cavities, not only eliminating the need for assembling by welding, reducing the difficulty of debugging and production, but also improving a quality (Q) value of the filter.

Additional aspects will be set forth in part in the description which follows and, in part, will be apparent from the description, or may be learned by practice of the presented embodiments.

In accordance with an aspect of the disclosure, a dual-mode dielectric waveguide filter is provided. The dual-mode dielectric waveguide filter includes a first dielectric cavity including a first dielectric body, a second dielectric cavity including a second dielectric body, the first dielectric body and the second dielectric body being integrally connected, and electric field directions of the first dielectric cavity and the second dielectric cavity being perpendicular to each other, a coupling portion connected with the first dielectric body and the second dielectric body to provide coupling of the first dielectric cavity and the second dielectric cavity, and a metal plating covering outer surfaces of the first dielectric body, the second dielectric body, and the coupling portion.

The first dielectric body and the second dielectric body are both formed in a rectangular parallelepiped shape, the first dielectric body and the second dielectric body are arranged in a stacked manner in a first direction, in at least any one of a second direction and a third direction, a size of the first dielectric body is smaller than a size of the second dielectric body, and center lines of the first dielectric cavity and the second dielectric cavity are aligned, the first direction, the second direction, and the third direction are perpendicular to each other, and two end faces of the first dielectric cavity and the second dielectric cavity in the third direction are formed as a coupling end face. In at least one embodiment, a volume of the first dielectric body is less than a volume of the second dielectric body.

In one embodiment, in the third direction, the size of the first dielectric body and the size of the second dielectric body are consistent, and in the second direction, the size of the first dielectric body is smaller than the size of the second dielectric body. Furthermore, in the second direction, the first dielectric body is centrally aligned with the second dielectric body.

In one embodiment, the electric field direction of the first dielectric cavity is the second direction, and the electric field direction of the second dielectric cavity is the first direction.

In one embodiment, in the second direction, the first dielectric body has a first surface of the first dielectric body and a second surface of the first dielectric body, the first surface of the first dielectric body and the second surface of the first dielectric body are arranged opposite each other, and in the first direction, the second dielectric body has a first surface of the second dielectric body and a second surface of the second dielectric body, the first surface of the second dielectric body and the second surface of the second dielectric body are arranged opposite each other.

In one embodiment, the first dielectric body is connected to the first surface of the second dielectric body, and the electric field direction of the second dielectric cavity is towards the second surface of the second dielectric body.

In one embodiment, the coupling portion is connected to the first surface of the first dielectric body and the first surface of the second dielectric body, and the electric field direction of the first dielectric cavity is towards the second surface of the first dielectric body.

In one embodiment, the first dielectric cavity includes a first tuning blind hole recessed from the second surface of the first dielectric body into an interior of the first dielectric body, and the second dielectric cavity includes a second tuning blind hole recessed from the second surface of the first dielectric body into an interior of the second dielectric body.

In accordance with another aspect of the disclosure, a dielectric waveguide filtering apparatus is provided. The dielectric waveguide filtering apparatus includes at least two dual-mode dielectric waveguide filters as described above.

Two adjacent dual-mode dielectric waveguide filters of the at least two dual-mode dielectric waveguide filters are directly coupled by the coupling end face, and coupling portions of the two adjacent dual-mode dielectric waveguide filters are towards opposite directions to form a zero point at each end of a passband.

In one embodiment, a coupling end face of the two adjacent dual-mode dielectric waveguide filters includes an end face of the first dielectric cavity or an end face of the second dielectric cavity.

In one embodiment, the at least two dual-mode dielectric waveguide filters are arranged along a straight line.

In the embodiment, the dual-mode dielectric waveguide filter is provided, which is formed by coupling two dielectric cavities whose electric field directions are perpendicular to each other. The dielectric bodies of the two dielectric cavities are directly integrally formed, and an electric field coupling is performed by the coupling portion connected to both the dielectric bodies. In the disclosure, the two dielectric cavities are coupled by the coupling portion directly connected to the dielectric body without being coupled through an additional welding structure, which is very convenient for the integrally formed production.

Further, in the disclosure, in a height direction, the first dielectric body and the second dielectric body are arranged in a stacked manner, for example, the first dielectric body is placed on the second dielectric body. The first dielectric body has a smaller size than the second dielectric body in at least any one of the width and length directions, and thereby a constricted portion is formed above the second dielectric body, and further a spatial position is provided for the coupling portion at the constricted portion to provide coupling of the first dielectric cavity and second dielectric cavity. The coupling portion is connected to both the first dielectric body and the second dielectric body.

After the first dielectric body, the second dielectric body, and the coupling portion are integrally formed, the metal plating may be formed on the outer surface of the whole thereof to provide one dielectric waveguide filter having a capacitive zero point or an inductive zero point.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces. Embodiments of the disclosure provide a dual-mode dielectric waveguide filter and a dielectric waveguide filtering apparatus including the dual-mode dielectric waveguide filter, which provides dual-mode filtering by two integrally formed dielectric single cavities, not only eliminating the need for assembling by welding, reducing the difficulty of debugging and production, but also improving a quality (Q) value of the filter. The Q value of the filter referred as the Q factor. The Q value of the cavity filter is a measure of its bandwidth and selectivity. The Q value is defined as the ratio of the resonant frequency to the bandwidth. A higher Q factor means a narrower bandwidth and a higher selectivity. The Q factor of a cavity filter is determined by the size, shape, and material of the cavity, as well as the losses in the cavity and the coupling between the cavity and the external circuit. Higher Q factors are typically required for applications where narrow bandwidth and high selectivity are important, such as in radio receivers and oscillators.

Figure 1:
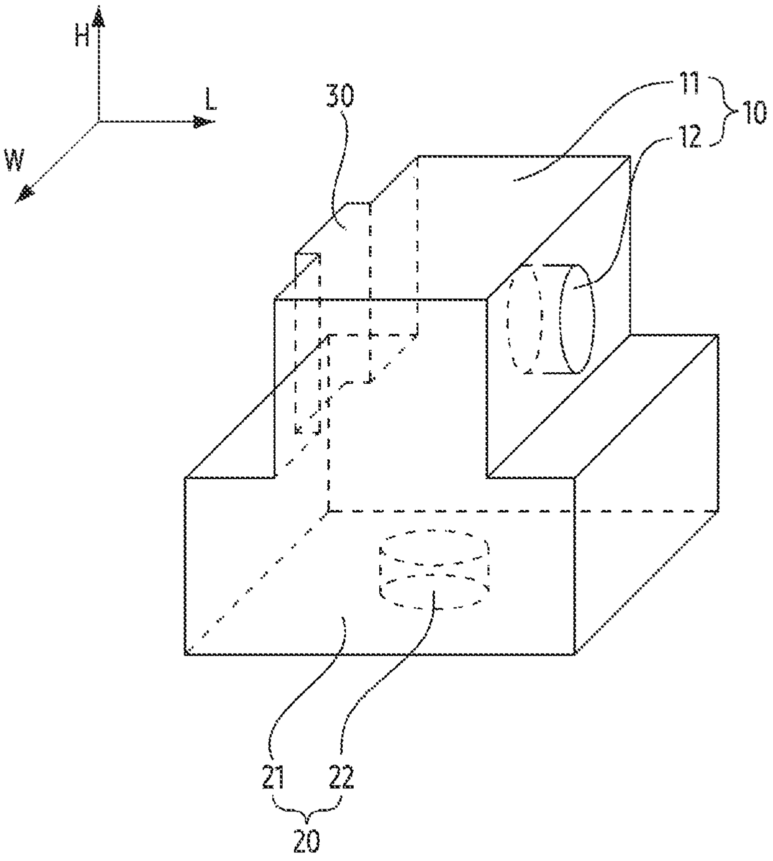
FIG. 1 is a perspective view of a dual-mode dielectric waveguide filter according to an embodiment of the disclosure.
Figure 2:
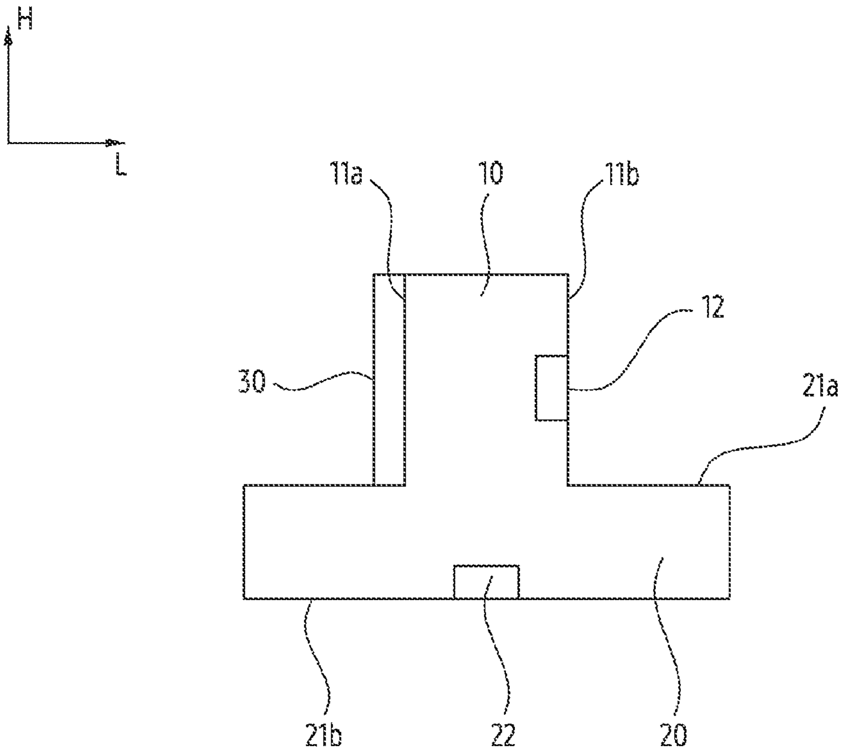
FIG. 2 is a side view of a dual-mode dielectric waveguide filter according to an embodiment of the disclosure.

FIG. 1 is a perspective view of a dual-mode dielectric waveguide filter according to an embodiment of the disclosure. FIG. 2 is a side view of a dual-mode dielectric waveguide filter according to an embodiment of the disclosure.

Referring to FIG. 1, one embodiment of disclosure provides a dual-mode dielectric waveguide filter 1, including: a first dielectric cavity 10 including a first dielectric body 11; a second dielectric cavity 20 including a second dielectric body 21, the first dielectric body 11 and the second dielectric body 21 being integrally connected, and electric field directions of the first dielectric cavity 10 and the second dielectric cavity 20 being perpendicular to each other; a coupling portion 30 connected with the first dielectric body 11 and the second dielectric body 21 to provide coupling of the first dielectric cavity 10 and the second dielectric cavity 20; and a metal plating covering outer surfaces of the first dielectric body 11, the second dielectric body 21, and the coupling portion 30.

The first dielectric body 11 and the second dielectric body 21 are both formed in a rectangular parallelepiped shape, the first dielectric body 11 and the second dielectric body 21 are arranged in a stacked manner in a first direction H, in at least any one of a second direction L and a third direction W, a size of the first dielectric body 11 is smaller than a size of the second dielectric body 21; the first direction H, the second direction L, and the third direction W are perpendicular to each other; and two end faces of the first dielectric cavity 10 and the second dielectric cavity 20 in the second direction L or the third direction W are formed as a coupling end face.

In the disclosure, a three-dimensional coordinate system is described as an example, where the first direction H is a height direction extending in a vertical direction, the second direction L and the third direction W are two directions perpendicular to each other in a horizontal plane, the second direction L is a length direction, and the third direction W is a width direction. The naming manner of directions is merely for convenience to distinguish, not for limitation.

The dual-mode dielectric waveguide filter may use cavities. The dual-mode dielectric waveguide filter is a type of cavity filter that has two resonant modes. This means that the filter can pass two different frequencies of electromagnetic waves. The dual-mode dielectric waveguide filter is often used in telecommunication systems, where they can be used to filter out unwanted frequencies. The dual-mode dielectric waveguide filter works by having two cavities that are coupled together. The cavities are designed so that they have different resonant frequencies. When an electromagnetic wave enters the filter, it is split into two waves, one for each cavity. The waves then travel through the cavities and are reflected back. When the waves reach the output of the filter, they are recombined and the filter passes only the frequencies that are resonant in both cavities.

In the disclosure, the dual-mode dielectric waveguide filter is provided, which is formed by coupling two dielectric cavities whose electric field directions are perpendicular to each other. The dielectric bodies of the two dielectric cavities are directly integrally formed, and a coupling is performed by the coupling portion connected to both the dielectric bodies. In the disclosure, the two dielectric cavities are coupled by the coupling portion directly connected to the dielectric body without being coupled through an additional welding structure, which is very convenient for the integrally formed production. Compared with a single-mode cavity filter, a dual-mode cavity filter may improve the Q value.

Further, in the disclosure, in a height direction, the first dielectric body 11 and the second dielectric body 21 are arranged in a stacked manner, for example, the first dielectric body 11 is placed on the second dielectric body 21. The first dielectric body 11 has a smaller size than the second dielectric body 21 in at least any one of the width and length directions, thereby a constricted portion is formed above the second dielectric body 21, and further a spatial position is provided for the coupling portion 30 by the constricted portion to provide coupling of the first dielectric cavity 10 and the second dielectric cavity 20. The coupling portion 30 is connected to both the first dielectric body 11 and the second dielectric body 21.

A size of the coupling portion 30 is associated with a magnitude of a coupling amount, and the magnitude of the coupling amount may be adjusted by adjusting the size of the coupling portion. A position of the coupling portion 30 may adjust the positive and negative of the coupling. For example, the coupling portion 30 on the left side of the first dielectric body 11 corresponds to a positive coupling, and on the right side of the first dielectric body 11 corresponds to a negative coupling. This correspondence is not limited to this, but vice versa and needs to be determined according to actual situations.

After the first dielectric body 11, the second dielectric body 21, and the coupling portion 30 are integrally formed, the metal plating may be formed on the outer surface of the whole thereof to provide one dielectric waveguide filter having a capacitive zero point or an inductive zero point.

The dual-mode dielectric waveguide filter according to an embodiment of the disclosure provides dual-mode filtering without assembling by welding, and can adjust a phase of the coupling by adjusting the position of the coupling portion, thereby providing a zero point.

The coupling end face of the dual-mode dielectric waveguide filter according to an embodiment of the disclosure may be formed at the ends of the first dielectric cavity 10 and the second dielectric cavity 20. For example, if a size of the first dielectric body 11 in the width direction is smaller than a size of the second dielectric body 21 in the width direction, an end face of the first dielectric cavity 10 and an end face of the second dielectric cavity 20 in the length direction may be formed as the coupling end face, or if a size of the first dielectric body 11 in the length direction is smaller than a size of the second dielectric body 21 in the length direction, an end face of the first dielectric cavity 10 and an end face of the second dielectric cavity 20 in the width direction may be formed as the coupling end face.

In one specific embodiment, in the third direction W, the sizes of the first dielectric body 11 and the second dielectric body 21 are consistent, and in the second direction L, the size of the first dielectric body 11 is smaller than the size of the second dielectric body 21, in the second direction L, the first dielectric body 11 is centrally aligned with the second dielectric body 21.

In an implementation, the first dielectric body 11 is formed at the center of the second dielectric body 21 and symmetrically provided about a central axis in a certain direction. For example, in the width direction, the sizes of the first dielectric body 11 and the second dielectric body 21 are consistent, and in the length direction, the size of the first dielectric body 11 is smaller than the size of the second dielectric body 21. Thus, referring to FIG. 2, it can be seen that the first dielectric cavity and the second dielectric cavity form an inverted "T" shape. And two end faces in the third direction W are formed as the coupling end face of the filter 1. On the coupling end face, both the end face of the first dielectric cavity 10 and the end face of the second dielectric cavity 20 are contained. The coupling end face may be directly provided with a coupling window to provide (realize) the coupling with the first dielectric cavity 10, the coupling with the second dielectric cavity 20, or the coupling with the first dielectric cavity 10 and the second dielectric cavity 20 at the same time.

Figure 3A:
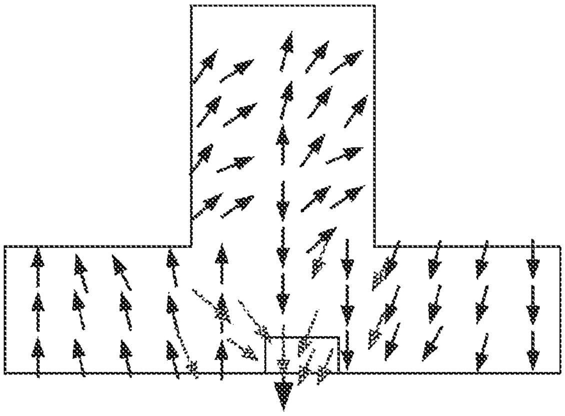
FIGS. 3A and 3B are schematic diagrams of electric field directions of a dual-mode dielectric waveguide filter according to various embodiments of the disclosure.
Figure 3B:
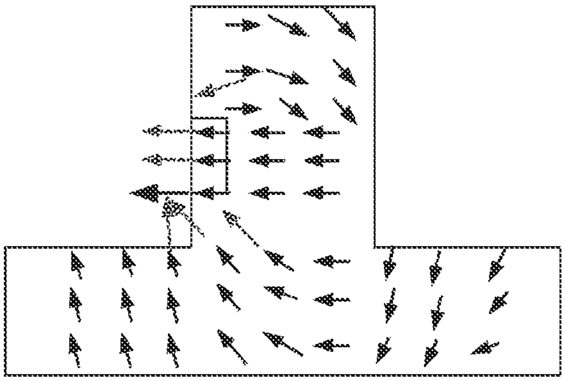

FIGS. 3A and 3B are schematic diagrams of electric field directions of a dual-mode dielectric waveguide filter according to various embodiments of the disclosure.

Referring to FIGS. 3A and 3B, the electric field direction of the first dielectric cavity 10 is the second direction L, and the electric field direction of the second dielectric cavity 20 is the first direction H.

Referring to FIG. 2, in the second direction L, the first dielectric body 11 has a first surface of the first body 11*a* and a second surface of the first body 11*b*. the first surface of the first body 11*a* and the second surface of the first body 11*b* are arranged opposite each other.

In the first direction H, the second dielectric body 21 has a first surface of the second body 21*a* and a second surface of the second body 21*b*. the first surface of the second body 21*a* and the second surface of the second body 21*b* are arranged opposite each other.

Specifically, the first surface of the second body 21*a* is an upper surface of the second dielectric body 21, the first dielectric body 11 is provided on the first surface of the second body 21*a*, and the electric field direction of the second dielectric cavity 20 is towards the second surface of the second body 21*b*. That is, in a first mode shown in FIG. 3A, a radiation direction is a direction away from the first dielectric cavity 10.

Referring to FIG. 1, the coupling portion 30 is connected to the first surface of the first body 11*a* and the first surface of the second body 21*a*, and the electric field direction of the first dielectric cavity 10 is towards the second surface of the first body 11*b*.

That is, in the second mode as shown in FIG. 3B, the electric field direction is a direction away from the coupling portion 30. A direction in which the coupling portion 30 is provided is related to a position of the zero point.

In one preferred example, the first dielectric cavity 10 includes a first tuning blind hole 12 recessed from the second surface of the first body 11*b* into an interior of the first dielectric body 11.

The second dielectric cavity 20 includes a second tuning blind hole 22 recessed from the second surface of the first body 11*b* into an interior of the second dielectric body 21.

The first tuning blind hole 12 and the coupling portion 30 are separately provided on a pair of opposite surfaces of the first dielectric cavity 10. A surface of the first tuning blind hole 12 is covered with metal, and an adjustment of a frequency is provided by controlling a thickness of a metal layer.

The second tuning blind hole 22 and the first dielectric cavity 10 are separately provided on a pair of opposite surfaces of the second dielectric cavity 20. A surface of the second tuning blind hole 22 is covered with metal, and an adjustment of a frequency is provided by controlling a thickness of a metal layer.

Figure 4:
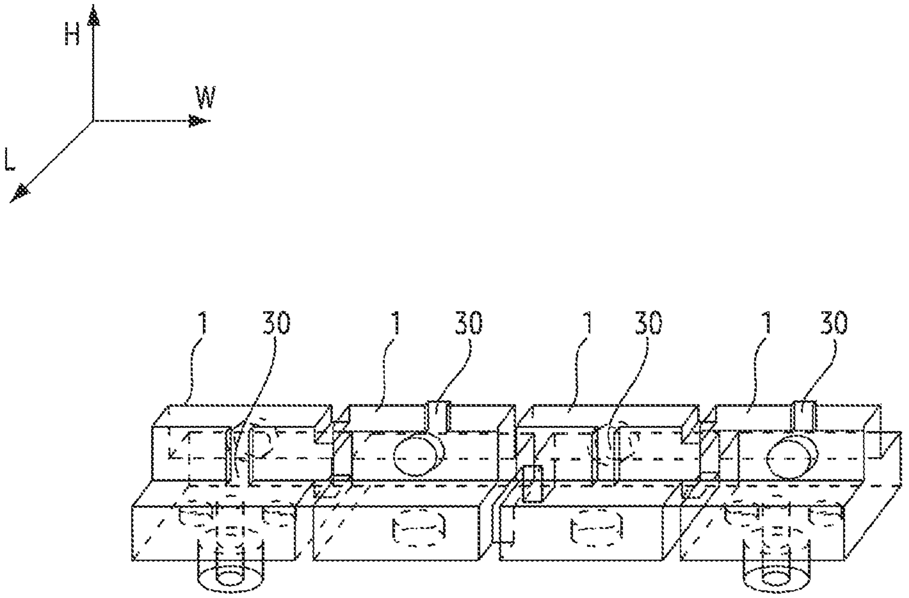
FIG. 4 is a structural schematic diagram of a dielectric waveguide filtering apparatus according to an embodiment of the disclosure.

FIG. 4 is a structural schematic diagram of a dielectric waveguide filtering apparatus according to an embodiment of the disclosure.

Referring to FIG. 4, another embodiment of the disclosure also provides the dielectric waveguide filtering apparatus, including: at least two dual-mode dielectric waveguide filters 1 as shown in FIG. 1.

Two adjacent dual-mode dielectric waveguide filters 1 are directly coupled by the coupling end face, and coupling portions 30 of the two adjacent dual-mode dielectric waveguide filters 1 are towards opposite directions to form a zero point at each end of the passband.

An example of FIG. 4 shows an 8-cavity 4-zero point filtering apparatus including 4 dual-mode dielectric waveguide filters 1 as shown in FIG. 1. Each dual-mode dielectric waveguide filter 1 includes 2 cavities and generates 1 zero point. The two adjacent dual-mode dielectric waveguide filters 1 are directly coupled by the coupling end face, and the coupling portions 30 of the two adjacent dual-mode dielectric waveguide filters 1 are towards opposite directions.

Figure 5:
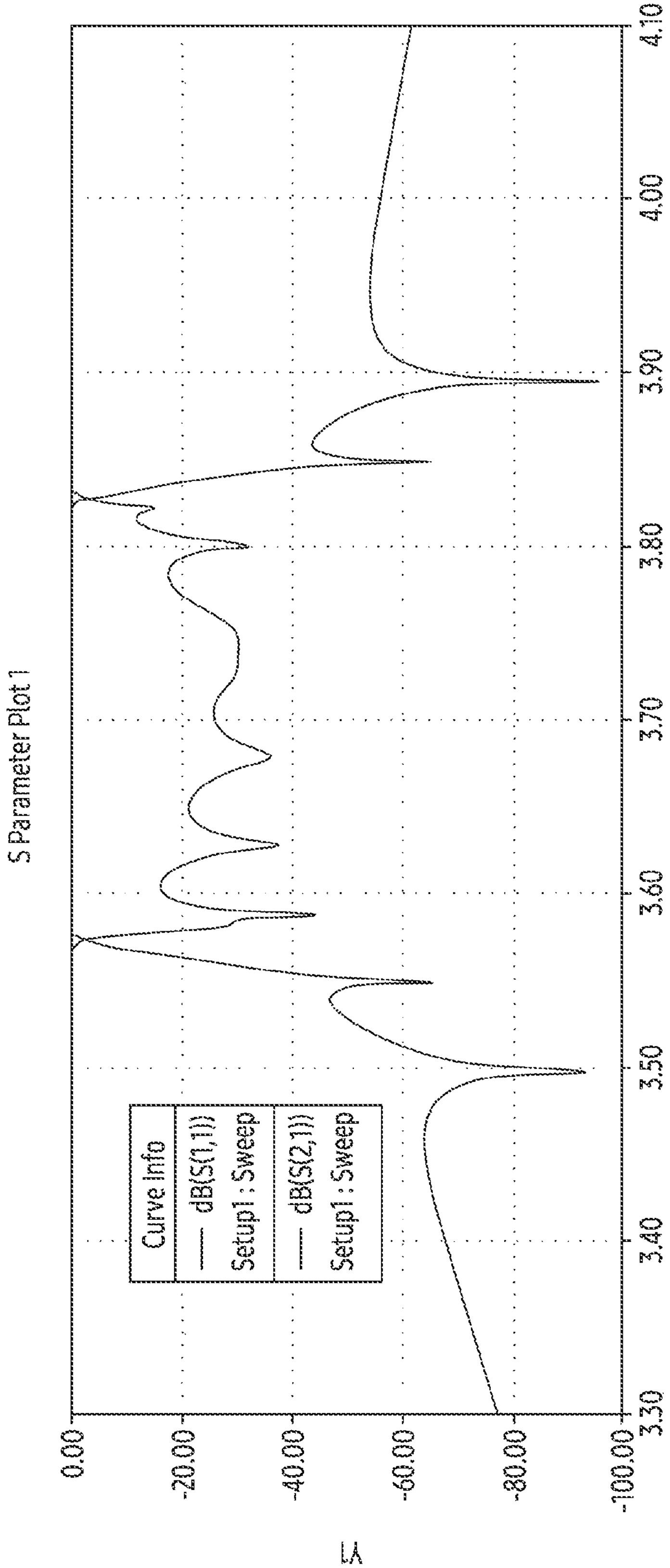
FIG. 5 is a schematic diagram of a passband of a dielectric waveguide filtering apparatus according to an embodiment of the disclosure.

FIG. 5 is a schematic diagram of a passband of a dielectric waveguide filtering apparatus according to an embodiment of the disclosure.

Referring to FIG. 5, a pair of adjacent dual-mode dielectric waveguide filters 1 may generate one capacitive zero point and one inductive zero point at two sides of the passband. The S-parameter S(2,1) indicates a transmission coefficient and the S-parameter S(1,1) indicates a reflection coefficient. For example, the S-parameter S(2,1) is shown between 3.56 GHz and 3.84 GHz. For example, the S-parameter S(1,1) is shown in the frequency region lower than 3.58 GHz and in the frequency region higher than 3.82 GHz. According to this coupling, the 8-cavity 4-zero point filtering apparatus shown in FIG. 4 may generate two capacitive zero points and two inductive zero points at two sides of the passband.

Further, coupling windows of the two adjacent dual-mode dielectric waveguide filters may be coupled to different objects according to requirements of the passband. For example, a coupling end face of the two adjacent dual-mode dielectric waveguide filters 1 includes an end face of the first dielectric cavity 10 and/or an end face of the second dielectric cavity 20.

For example, a coupling end face of the first filter and the second filter on the left in FIG. 4 includes an end face of the first dielectric cavity 10 and an end face of the second dielectric cavity 20, and couplings provided by this coupling window include coupling of the first dielectric cavity 10 of the first filter to the second dielectric cavity 20 of the second filter, coupling of the second dielectric cavity 20 of the first filter to the second dielectric cavity 20 of the second filter, coupling of the first dielectric cavity 10 of the first filter to the first dielectric cavity 10 of the second filter, and coupling of the second dielectric cavity 20 of the first filter to the first dielectric cavity 10 of the second filter.

A coupling end face of the second filter and third filter on the left in FIG. 4 includes an end face of the second dielectric cavity 20, and the coupling provided by this coupling window only includes coupling of the second dielectric cavity 20 of the second filter to the second dielectric cavity 20 of the third filter.

In the disclosure, since the coupling end face is provided at two end faces in the third direction, at least two dual-mode dielectric waveguide filters 1 are arranged along a straight line. Furthermore, since each filter may generate one zero point, and one zero point may be generated at each end of the passband by setting a coupling direction, there is no need to additionally provide a coupling flying rod between adjacent cavity filters. Therefore, there is no need to arrange positions of the filters alternately in order to achieve cross-coupling.

Referring to FIG. 4, feed terminals of the filtering apparatus according to an embodiment of the disclosure are installed in the filter 1 at the starting end and the terminating end, and are provided on the second surface of the second body 21*b* of the second dielectric cavity and may be provided coplanar with the second tuning blind hole.

In the disclosure, the dual-mode dielectric waveguide filter is provided, which is formed by coupling two dielectric cavities whose electric field directions are perpendicular to each other. The dielectric bodies of the two dielectric cavities are directly integrally formed, and an electric field coupling is performed by the coupling portion connected to both the dielectric bodies. In the disclosure, the two dielectric cavities are coupled by the coupling portion directly connected to the dielectric body without being coupled through an additional welding structure, which is very convenient for the integrally formed production.

Further, in the disclosure, in a height direction, the first dielectric body and the second dielectric body are arranged in a stacked manner, for example, the first dielectric body is placed on the second dielectric body. The first dielectric body has a smaller size than the second dielectric body in at least any one of the width and length directions, and thereby a constricted portion is formed above the second dielectric body, and further a spatial position is provided for the coupling portion at the constricted portion to provide coupling of the first dielectric cavity and second dielectric cavity. The coupling portion is connected to both the first dielectric body and the second dielectric body.

After the first dielectric body, the second dielectric body, and the coupling portion are integrally formed, the metal plating may be formed on the outer surface of the whole thereof to provide one dielectric waveguide filter having a capacitive zero point or an inductive zero point.

The dual-mode dielectric waveguide filter according to an embodiment of the disclosure provides dual-mode filtering without assembling by welding, and can provide one zero point using one cavity filter, and may provide the zero point without coupling structures located outside the cavity filter (e.g., a flying rod) or the like.

According to embodiments, a dual-mode dielectric waveguide filter is provided. The dual-mode dielectric waveguide filter comprises a first dielectric cavity comprising a first dielectric body, a second dielectric cavity comprising a second dielectric body, the first dielectric body and the second dielectric body being integrally connected, a coupling portion connected with the first dielectric body and the second dielectric body, and a metal plating covering outer surfaces of the first dielectric body, the second dielectric body, and the coupling portion. The first dielectric body and the second dielectric body are arranged in a stacked manner in a first direction. In at least any one of a second direction and a third direction, a size of the first dielectric body is smaller than a size of the second dielectric body. In the first direction, a center line of the first dielectric cavity and a center line of the second dielectric cavity are aligned. The first direction, the second direction, and the third direction are perpendicular to each other. Two end faces of the first dielectric cavity and the second dielectric cavity in the second direction or the third direction are formed as a coupling end face.

According to an embodiment, in the third direction, the size of the first dielectric body and the size of the second dielectric body are consistent, and in the second direction, the size of the first dielectric body is smaller than the size of the second dielectric body. In the second direction, the first dielectric body is centrally aligned with the second dielectric body.

According to an embodiment, the electric field direction of the first dielectric cavity is the second direction, and the electric field direction of the second dielectric cavity is the first direction.

According to an embodiment, in the second direction, the first dielectric body has a first surface of the first dielectric body and a second surface of the first dielectric body, and the first surface of the first dielectric body and the second surface of the first dielectric body are arranged opposite each other. In the first direction, the second dielectric body has a first surface of the second dielectric body and a second surface of the second dielectric body, and the first surface of the second dielectric body and the second surface of the second dielectric body are arranged opposite each other.

According to an embodiment, the first dielectric body is connected to the first surface of the second dielectric body, and the electric field direction of the second dielectric cavity is towards the second surface of the second dielectric body.

According to an embodiment, the first dielectric cavity comprises a first tuning blind hole recessed from the second surface of the first dielectric body into an interior of the first dielectric body. The second dielectric cavity comprises a second tuning blind hole recessed from the second surface of the first dielectric body into an interior of the second dielectric body.

According to an embodiment, wherein the coupling portion is connected to the first surface of the first dielectric body and the first surface of the second dielectric body. The electric field direction of the first dielectric cavity is towards the second surface of the first dielectric body.

According to an embodiment, an electric field direction of the first dielectric cavity and an electric field direction of the second dielectric cavity are perpendicular to each other.

According to an embodiment, the first dielectric body is formed in a rectangular parallelepiped shape. The second dielectric body is formed in a rectangular parallelepiped shape.

According to embodiments, a dielectric waveguide filtering apparatus is provided. The dielectric waveguide filtering apparatus comprises at least two dual-mode dielectric waveguide filters. Each of the at least two dual-mode dielectric waveguide filters comprises a first dielectric cavity comprising a first dielectric body, a second dielectric cavity comprising a second dielectric body, the first dielectric body and the second dielectric body being integrally connected, a coupling portion connected with the first dielectric body and the second dielectric body, and a metal plating covering outer surfaces of the first dielectric body, the second dielectric body, and the coupling portion. The first dielectric body and the second dielectric body are arranged in a stacked manner in a first direction. In at least any one of a second direction and a third direction, a size of the first dielectric body is smaller than a size of the second dielectric body. In the first direction, a center line of the first dielectric cavity and a center line of the second dielectric cavity are aligned. The first direction, the second direction, and the third direction are perpendicular to each other. Two end faces of the first dielectric cavity and the second dielectric cavity in the second direction or the third direction are formed as a coupling end face.

According to an embodiment, two adjacent dual-mode dielectric waveguide filters of the at least two dual-mode dielectric waveguide filters are directly coupled by coupling end faces of the two adjacent dual-mode dielectric waveguide filters. Coupling portions of the two adjacent dual-mode dielectric waveguide filters are towards opposite directions to form a zero point at each end of a passband.

According to an embodiment, the coupling end faces of the two adjacent dual-mode dielectric waveguide filters comprises an end face of the first dielectric cavity of a first dual-mode dielectric waveguide filter and an end face of the second dielectric cavity of a second dual-mode dielectric waveguide filter.

According to an embodiment, the at least two dual-mode dielectric waveguide filters are arranged along a straight line.

Although basic principles of the disclosure have been described above in connection with specific embodiments, it should be noted that strengths, advantages, effects, etc. mentioned in the disclosure are merely examples and not limitations, and these strengths, advantages, effects, etc. must be possessed by various embodiments of the disclosure. Furthermore, the specific details disclosed above are for purposes of example and understanding only and are not for limitation. The above details do not limit disclosure to the specific details above that must be used to achieve it.

Block diagrams of elements, apparatus, devices, and systems referred to in the disclosure are merely examples and are not intended to require or imply that the connections, arrangements, and configurations must be performed in the manner shown in the block diagrams. These elements, apparatus, devices, and systems may be connected, arranged, and configured in any manner, as will be recognized by those skilled in the art. Words such as “comprising”, “including”, “having” are open-ended terms that mean “including, but not limited to”, and may be used interchangeably therewith. The words “or” and “and” as used herein refer to the word “and/or” and may be used interchangeably therewith unless the context clearly dictates otherwise. The word “such as” as used herein refers to the phrase “such as, but not limited to”, and may be used interchangeably therewith.

It should also be noted that components or steps may be decomposed and/or recombined in apparatus, devices, and methods of the disclosure. These decompositions and/or recombinations should be considered as equivalent solutions to the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A dual-mode dielectric waveguide filter, comprising:

a first dielectric cavity comprising a first dielectric body and a first blind hole;

a second dielectric cavity comprising a second dielectric body and a second blind hole, wherein the second dielectric body is integrally formed with the first dielectric body;

a coupling portion connecting a first side of the first dielectric body and a first side of the second dielectric body; and a metal plating covering outer surfaces of the first dielectric body, the second dielectric body, and the coupling portion, wherein the first blind hole is recessed from a second side of the first dielectric body opposite to the first side of the first dielectric body, and wherein the second blind hole is recessed from a second side of the second dielectric body opposite to the first side of the second dielectric body.

2. The dual-mode dielectric waveguide filter according to claim 1, wherein the first dielectric body is protruded from the second dielectric body and the first dielectric body is centrally aligned with the second dielectric body in a cross-sectional view.

3. The dual-mode dielectric waveguide filter according to claim 1, wherein an electric field direction of the first dielectric cavity is towards the second side of the first dielectric body, and an electric field direction of the second dielectric cavity is towards the second side of the second dielectric body.

4. The dual-mode dielectric waveguide filter according to claim 1, wherein a volume of the first dielectric body is less than a volume of the second dielectric body.

5. The dual-mode dielectric waveguide filter according to claim 1, wherein the first dielectric body and the second dielectric body are arranged in a stacked manner.

6. The dual-mode dielectric waveguide filter according to claim 1, wherein the coupling portion is protruded from the first dielectric body in a plan view.

7. The dual-mode dielectric waveguide filter according to claim 1, wherein the coupling portion is protruded from the second dielectric body in a cross-sectional view.

8. The dual-mode dielectric waveguide filter according to claim 1, wherein an electric field direction of the first dielectric cavity and an electric field direction of the second dielectric cavity are perpendicular to each other.

9. The dual-mode dielectric waveguide filter according to claim 1, wherein the first dielectric body is formed in a rectangular parallelepiped shape, and wherein the second dielectric body is formed in a rectangular parallelepiped shape.

10. A dielectric waveguide filtering apparatus comprising:

at least two dual-mode dielectric waveguide filters, wherein each of the at least two dual-mode dielectric waveguide filters comprises:

a first dielectric cavity comprising a first dielectric body and a first blind hole;

a second dielectric cavity comprising a second dielectric body and a second blind hole, wherein the second dielectric body is integrally formed with the first dielectric body;

a coupling portion connecting a first side of the first dielectric body and a first side of the second dielectric body; and a metal plating covering outer surfaces of the first dielectric body, the second dielectric body, and the coupling portion, wherein the first blind hole is recessed from a second side of the first dielectric body opposite to the first side of the first dielectric body, and wherein the second blind hole is recessed from a second side of the second dielectric body opposite to the first side of the second dielectric body.

11. The dielectric waveguide filtering apparatus of claim 10, wherein two adjacent dual-mode dielectric waveguide filters of the at least two dual-mode dielectric waveguide filters are directly coupled by coupling end faces of the two adjacent dual-mode dielectric waveguide filters, and wherein coupling portions of the two adjacent dual-mode dielectric waveguide filters are towards opposite directions to form a zero point at each end of a passband.

12. The dielectric waveguide filtering apparatus according to claim 11, wherein the coupling end faces of the two adjacent dual-mode dielectric waveguide filters comprises an end face of the first dielectric cavity of a first dual-mode dielectric waveguide filter and an end face of the second dielectric cavity of a second dual-mode dielectric waveguide filter.

13. The dielectric waveguide filtering apparatus according to claim 10, wherein the at least two dual-mode dielectric waveguide filters are arranged along a straight line.

14. The dielectric waveguide filtering apparatus according to claim 10, wherein the first dielectric body is protruded from the second dielectric body and the first dielectric body is centrally aligned with the second dielectric body in a cross-sectional view.

15. The dielectric waveguide filtering apparatus according to claim 10, wherein an electric field direction of the first dielectric cavity is towards the second side of the first dielectric body, and an electric field direction of the second dielectric cavity is towards the second side of the second dielectric body.

16. The dielectric waveguide filtering apparatus according to claim 10, wherein a volume of the first dielectric body is less than a volume of the second dielectric body.

17. The dielectric waveguide filtering apparatus according to claim 10, wherein the first dielectric body and the second dielectric body are arranged in a stacked manner.

18. The dielectric waveguide filtering apparatus according to claim 10, wherein the coupling portion is protruded from the first dielectric body in a plan view.

19. The dielectric waveguide filtering apparatus according to claim 10, wherein the coupling portion is protruded from the second dielectric body in a cross-sectional view.

20. The dielectric waveguide filtering apparatus according to claim 10, wherein an electric field direction of the first dielectric cavity and an electric field direction of the second dielectric cavity are perpendicular to each other.

* * * * *